United States Patent [19]
Arai

[11] 3,931,995
[45] Jan. 13, 1976

[54] TEMPORARY LATCH RELEASING MECHANISM FOR TWO DOOR VEHICLE FRONT SEAT

[75] Inventor: Tomiji Arai, Tokorozawa, Japan

[73] Assignee: Nissan Motor Company Limited, Yokohama, Japan

[22] Filed: July 19, 1974

[21] Appl. No.: 489,895

[30] Foreign Application Priority Data
July 23, 1973 Japan.............................. 48-80981

[52] U.S. Cl................................. 297/341; 297/379
[51] Int. Cl.²......................................... B60N 1/04
[58] Field of Search............................ 297/341, 379

[56] References Cited
UNITED STATES PATENTS

| | | | |
|---|---|---|---|
| 2,189,396 | 2/1940 | Greig | 297/341 |
| 2,428,217 | 9/1947 | Hedley | 297/341 |
| 2,618,312 | 11/1952 | Bradley | 297/341 |
| 2,820,506 | 1/1958 | Duluk | 297/341 |
| 2,823,949 | 2/1958 | Williams | 297/341 X |
| 3,811,726 | 5/1974 | Muraishi | 297/341 |

Primary Examiner—Francis K. Zugel

[57] ABSTRACT

A latch release blade is provided with a bellcrank detent both mounted on an upper channel of fore and aft adjuster. A lever and link mechanism shifts, upon tilting the back forward, the latch release blade until locked by the detent to release the upper channel for forward movement along a lower channel. A detent release assembly is mounted on the lower channel to shift the detent to unlock the latch release blade.

7 Claims, 3 Drawing Figures

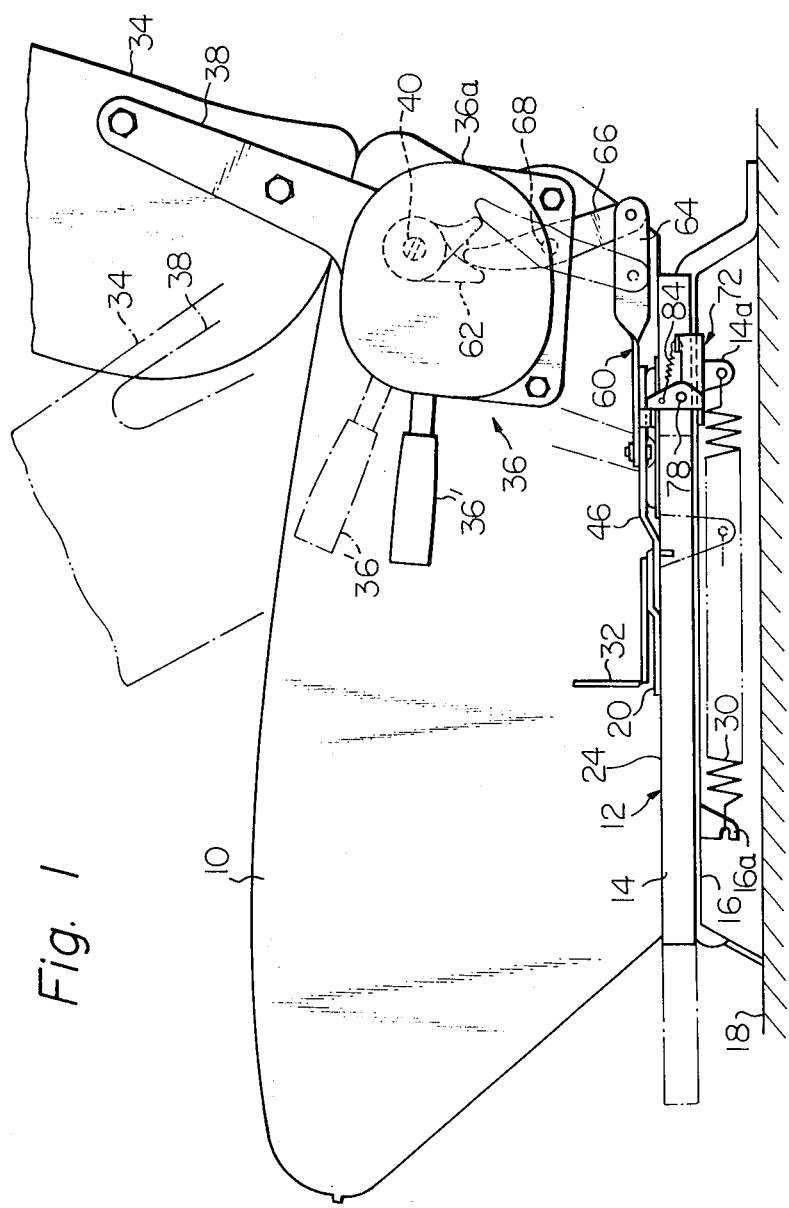

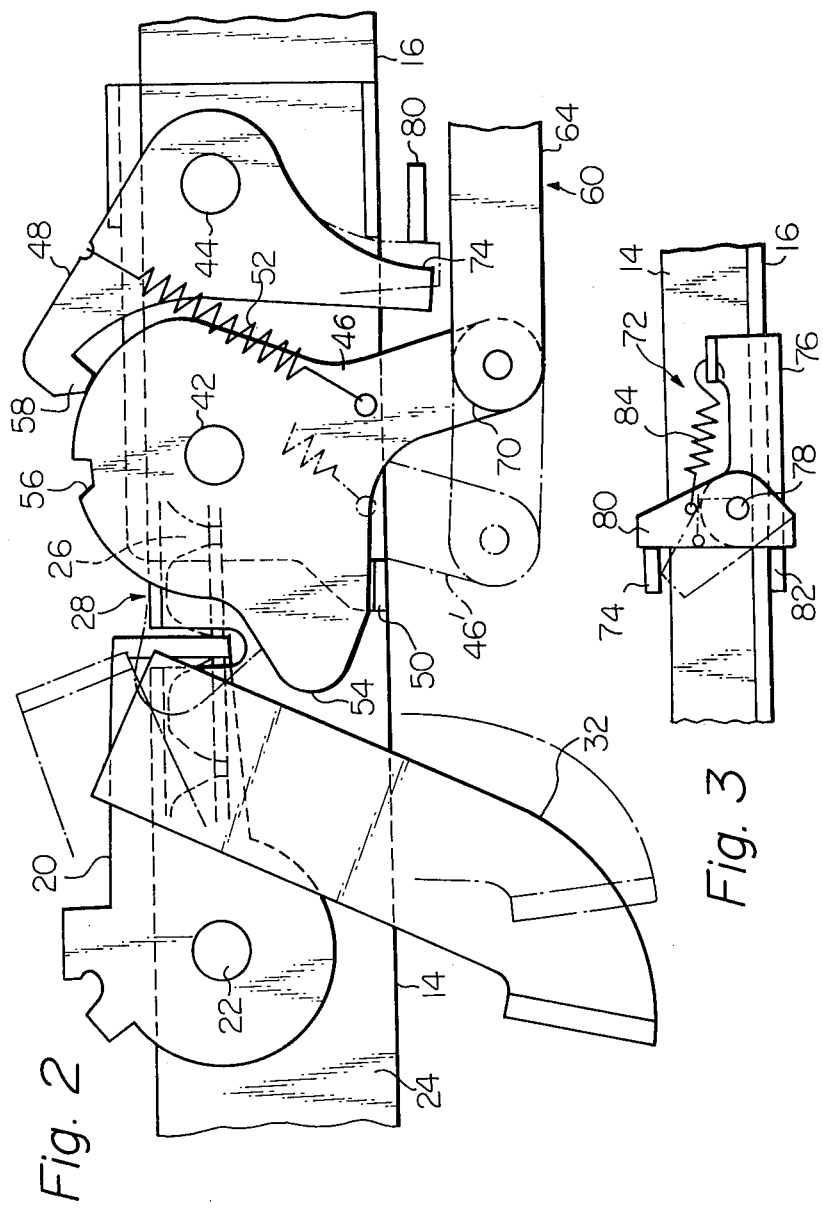

TEMPORARY LATCH RELEASING MECHANISM FOR TWO DOOR VEHICLE FRONT SEAT

The present invention relates to vehicle seats and more particularly to temporary latch releasing mechanisms for seats having tiltable backs.

Since a very large proportion of passenger-car production is of the two-door sedan type, seats having tiltable backs and seat fore and aft adjuster mechanisms are very common. To facilitate access to rear seats, the backs of the front seats are tilted forward and the adjuster mechanisms are operated to release the seats for forward movement relative to the floor.

An object of the present invention is to provide a temporary latch releasing mechanism which releases a seat for forward movement upon forward tilting of a back of the seat and causes the seat to be fixed relative to the floor upon return of the seat to a rearward position after returning the back to a generally upright position.

Further object of the present invention is to provide a temporary latch releasing mechanism of the above nature which is easily installed on conventional two-door vehicle front seats provided with fore and aft adjuster mechanism without considerable changes of conventional parts of the seats.

Particular object of the present invention is to provide a temporary latch releasing mechanism of the above nature which does not interfere with operations of conventional adjuster mechanism and positioning device of seat.

The invention will now be more precisely described with reference to the accompanying drawings, in which:

FIG. 1 is a side elevational view of a portion of a conventional two-door vehicle front seat having pivotally mounted forwardly tiltable back, showing the position of the temporary latch releasing mechanism of the invention when the back is not tilted forward and, in dotted lines, the position of the temporary latch releasing mechanism when the back is tilted forward;

FIG. 2 is a fragmentary plan view of a portion of an adjuster mechanism of the seat illustrated in FIG. 1, showing in solid lines the position of the temporary latch releasing mechanism when the back is not tilted forward and, in dotted lines, the position of the temporary latch releasing mechanism when the back is tilted forward; and FIG. 3 is a side elevational view of a portion of the adjuster mechanism illustrated in FIG. 2, showing a detent release assembly of the temporary latch releasing mechanism.

Referring now to the drawings and particularly to FIGS. 1 and 2 there is shown a conventional two-door vehicle front seat 10 which is secured to parallelly spaced apart fore and aft adjuster mechanism 12. While only one side of the seat with its mechanism is shown it will be understood that the adjuster mechanisms on both sides are alike and description of one side applies to both. Each adjuster mechanism 12 comprises a longitudinally extending upper channel member 14 which is adapted for forward and rearward movement along a lower channel member 16 to provide for various positions of adjuster of the seat. Lower channel 16 is mounted on the floor 18 of the vehicle. A forward and rearward adjustment adapted to secure the seat releasably in its various positions of adjustment is provided by a springurged latch 20 pivotally mounted on a stud 22 extending upwardly from upwardly facing surface 24 of the upper channel member 14 (see FIG. 2). Latch 20 is selectively engageable with any of the spaced notches 26 provided in the struckup blade portion 28 formed on the lower channel member 16 to provide spaced increments of adjustment of the seat. To assist manual forward movement of the seat, helical spring 30 is disposed under tension between a projection 14a secured to the rear end portion of the upper channel member 14 and a projection 16a secured to the front end portion of the lower channel member 16. A manual lever 32 to swing, against a biasing force, latch 20 to disengage from the struckup blade portion 28 is swingably mounted on the upper channel member 14 to release the upper channel member for forward and rearward movement relative to the lower channel member 16 when manual lever 32 is manipulated from the position shown in solid line in FIG. 2 to the position shown in phantom line (in counter or anti-clockwise direction as viewed in FIG. 2).

Near the rear edge of the seat 10 there is pivotally mounted a tiltable seat back 34 which normally adjustably takes one of a plurality of fixed rest positions by means of a positioning device 36. Seat back 34 is provided with a hinge arm 38 downwardly extending into a cover 36a of positioning device 36. Hinge arm 38 is pivotally secured on a pivot stud 40 extending laterally outwardly from the seat 10.

In accordance with this embodiment of the invention the upper channel member 14 has secured thereto two pivotal studs 42 and 44 which extend outwardly in upward direction from upwardly facing surface 24 thereof. Upon the pivotal studs 42 and 44 a latch release blade 46 and a bell crank detent 48 are pivotally mounted respectively. Latch release blade 46 is pivotable counterclockwise from the position shown in solid line (in FIG. 2) to the position shown in phantom line at 46'. A stop member 50 to prevent further counterclockwise movement caused by a spring 52, is formed on the upper channel member 14. The latch release blade 46 is formed with a cam portion 54 and a notch 56, with which a hook 58 formed on detent 48 is engageable. Spring 52 urges detent 48 in a counterclockwise direction (as viewed in FIG. 2) to cause hook 58 to engage notch 56 when latch release blade 46 is shifted to position 46' to lock the latch release blade against return. Means, generally indicated by a reference numeral 60, is provided to rotate, upon movement of seat back 34 when the back is tilted or folded forward as by lifting a reclining lever 36', the latch release blade 46 until the blade is locked by detent 48 to release upper channel member 14 for forward movement along the lower channel member 16. Release of the upper channel member 14 is accomplished by disengaging spring-urged latch 20 from struckup portion 28 with cam portion 54 of latch blade 46. It will now be understood that when the seat back 34 is tilted forward the latch release blade 46 continues to hold the upper channel member 14 released for forward movement, under the effect of helical spring 30, along the lower channel member 16 to provide easy access to and exit from rear seats (not shown).

Means 60 includes a short lever 62 swingable with back 34 about pivot stud 40 on which back 34 is mounted for tilting. A lever 66 is pivotally mounted on a stud 68 which is secured to the lateral side of the seat 10 downwardly of the pivot 40. The lever 66 has a free end portion abuttingly engageable with short lever 62 to be swinged thereby from the position shown in solid line to the position shown in phantom line (see FIG. 1) when back 34 is tilted forward. A link 64 is hingedly connected between the opposite end portion of lever 66 and a leg portion 70 of latch release blade 46 to shift the blade clockwise (as viewed in FIG. 2) from the position shown in solid line to the position shown in phantom line (see FIG. 2).

To unlock latch release blade 46 a detent release assembly 72 is mounted on lower channel 16 in the path of a trigger arm 74 of the bell-crank detent 48 projecting slightly beyond the side edge of the lower channel member 16. The detent release assembly 72, as best seen in FIG. 3, is adapted not to interfere with forward and rearward movements of seat 10, and is adapted only to release detent 48 for unlocking blade 46.

Referring particularly, to FIG. 3, detent release assembly 72 comprises a frame 76 attached to lower channel member 16. The frame 76 has a stud 78 extending transversely relative to the lower channel 16. An arm 80, rotatably mounted on the stud 78, abuts on the triger arm 74 when the detent 48 moves by past the arm 80 during forward and rearward movements of seat 10. The frame 76 is formed with a stop 82 to prevent rotation of the arm 80 by a spring 84 so that when upper channel 14 moves rearward relative to lower channel 16 toward detent release assembly 72 trigger arm 74 is caused to rotate clockwise (as viewed in FIG. 2) to unlock latch release blade 46, so that the upper channel 14 is secured again to the lower channel 16 by latch 20. It will also be seen that when upper rail 14 moves forward the detent release assembly 72 arm 80 rotates counterclockwise (as viewed in FIG. 1 or 3) to permit the trigger arm 74 to pass thereby.

Sliding of seat 10 takes place in the following manner when back 34 is tilted forward. When back 34 is tilted forward, lever 62 swings counterclockwise (as viewed in FIG. 1) with back 34 about pivot 40, and lever 66 clockwise about stud 68. Clockwise rotation of lever 66 causes latch release blade 46 to rotate clockwise (as viewed in FIG. 2) from the position shown in solid line to the position shown in phantom line. When latch release blade 46 takes the position shown in phantom line, latch 20 is disengaged from struckup portion 28 and detent 48 locks blade 46. Thus, as soon as back 34 is tilted forward the seat 10 moves forward by the force of helical spring 30.

By casuing seat 10, after returning the back 34 to the position shown in solid line in FIG. 1, to move rearwardly to the position where detent release assembly 72 is attached, detent 48 is caused to rotate by arm 80 to unlock the blade 46. When unlocked blade 46 returns to the position shown in FIG. 2 and latch 20 engages again with the struckup portion to lock upper channel 14 relative to lower channel 16.

From the preceding description of one embodiment of the present invention, it will now be seen that the mechanism is simple and does not require overall design change of conventional adjuster mechanism and reclining device. Thus it will be appreciated that the temporary latch releasing mechanism of the invention is best suited for use in a conventional two-door vehicle front seat provided with fore and aft adjuster and tiltable back.

What is claimed is:

1. A temporary latch releasing mechanism for a springurged latch pivotally mounted on an upper channel member adapted for forward and rearward movement along a lower channel member of an adjuster mechanism of a seat having a back pivotally mounted for tilting, comprising:
    a latch release blade pivotally mounted on the upper channel member for movement toward and away from a predetermined position at which the latch release blade releases the springurged latch;
    a bell-crank detent pivotally mounted on the upper channel member, the bell-crank detent having a trigger arm;
    operating means for moving, upon movement of the back when the back is tilted forward, the latch release blade to the predetermined position;
    means biasing the bell-crank detent in a predetermined direction to lock the latch release blade in the predetermined position when the latch release blade is moved to the predetermined position and the latch release blade away from the predetermined position; and
    detent release means for moving the trigger arm in an opposite direction to the predetermined direction to unlock the latch release blade when the trigger arm is moved by the detent release as a result of rearward movement of the upper channel member relative to the lower channel member.

2. A temporary latch releasing mechanism as claimed in claim 1, in which the biasing means is a spring mounted in tension between the bell-crank detent and the latch release blade.

3. A temporary latch releasing mechanism as claimed in claim 2, in which the latch release blade has a notch and the bell-crank detent has a hook, the hook being constructed and arranged on the bell-crank detent such that when the latch release blade is moved to the predetermined position, the hook engages the notch to lock the latch release blade in the predetermined position.

4. A temporary latch releasing mechanism as claimed in claim 2, in which the detent release means includes a portion disposed in the path of the arm of the bell-crank detent during forward and rearward movements of the upper channel relative to the lower channel, the portion serving as a stop to cause the arm of the bell-crank detent to rotate in opposite direction to the predetermined direction upon rearward movement of the upper channel relative to the lower channel beyond the predetermined relation, the portion being moved out of the path of the arm of the bell-crank detent arm of the bellcrank detent upon forward movement of the upper channel relative to the lower channel beyond the predetermined relation.

5. A temporary latch releasing mechanism as claimed in claim 2, in which the detent release means includes:
    a frame attached to the lower channel, the frame being a stud extending transversely relative to the lower channel;
    an arm mounted rotatably on the stud of the frame; and
    means whereby the arm of the detent release means is disposed so that the arm of the detent release means serves as a stop to cause the arm of the bell-crank detent to rotate in an opposite direction to the predetermined direction when the arm of the bell-crank detent is moved by the arm of the detent release means during rearward movement of the upper channel relative to the lower channel and the arm of the detent release means is rotated by the arm of the bell-crank detent when the arm of the bell-crank detent moves past the arm of the detent release means during forward movement of the upper channel relative to the lower channel.

6. A mechanism as claimed in claim 5, in which said operating means comprises a first lever swingable with the back about a pivot on which the back is mounted for tilting; a second lever pivotally mounted on a stud secured to a seat proper downwardly of the pivot, the second lever having an end portion abuttingly engageable with the first lever to swing thereby when the back is tilted forward and an opposite end portion; and a link connected between the opposite end portion of the second lever and the arm of the latch release blade.

7. In a seat having a back pivotally mounted for tilting a lower channel member having a struckup blade formed with spaced notches;

an upper channel member supporting the seat, the upper channel member being mounted on the lower channel member for forward and rearward movements along the lower channel member;

a latch pivotally mounted to the upper channel member, the latch being spring biased to engage with one of the spaced notches of the struckup blade;

a latch release blade pivotally mounted on the upper channel member for rotation toward and away from a predetermined position at which the latch release blade disengages the latch from the struckup blade to release the upper channel member for forward and rearward movements along the lower channel member;

a bell-crank detent pivotally mounted on the upper channel member, the bell-crank detent having a trigger arm;

means responsive to movement of the back when the back is tilted forward for rotating the latch release blade toward the predetermined position;

means for biasing the bell-crank detent in a predetermined direction to lock the latch release blade in the predetermined position when the latch release blade is rotated to the predetermined position and the latch release blade away from the predetermined position; and detent release means mounted to the lower channel member, the detent release means includes a portion disposed in the path of the trigger arm so that the portion rotates the trigger arm in an opposite direction to the predetermined direction when the trigger arm is moved by the portion during rearward movement of the upper channel member relative to the lower channel member and the portion is moved by the trigger arm out of the path of the trigger arm when the trigger arm moves past the portion during forward movement of the upper channel member relative to the lower channel member.

* * * * *